F. BROWN.
DIFFERENTIAL TRANSMISSION MECHANISM.
APPLICATION FILED JULY 12, 1912.
1,097,843.
Patented May 26, 1914.
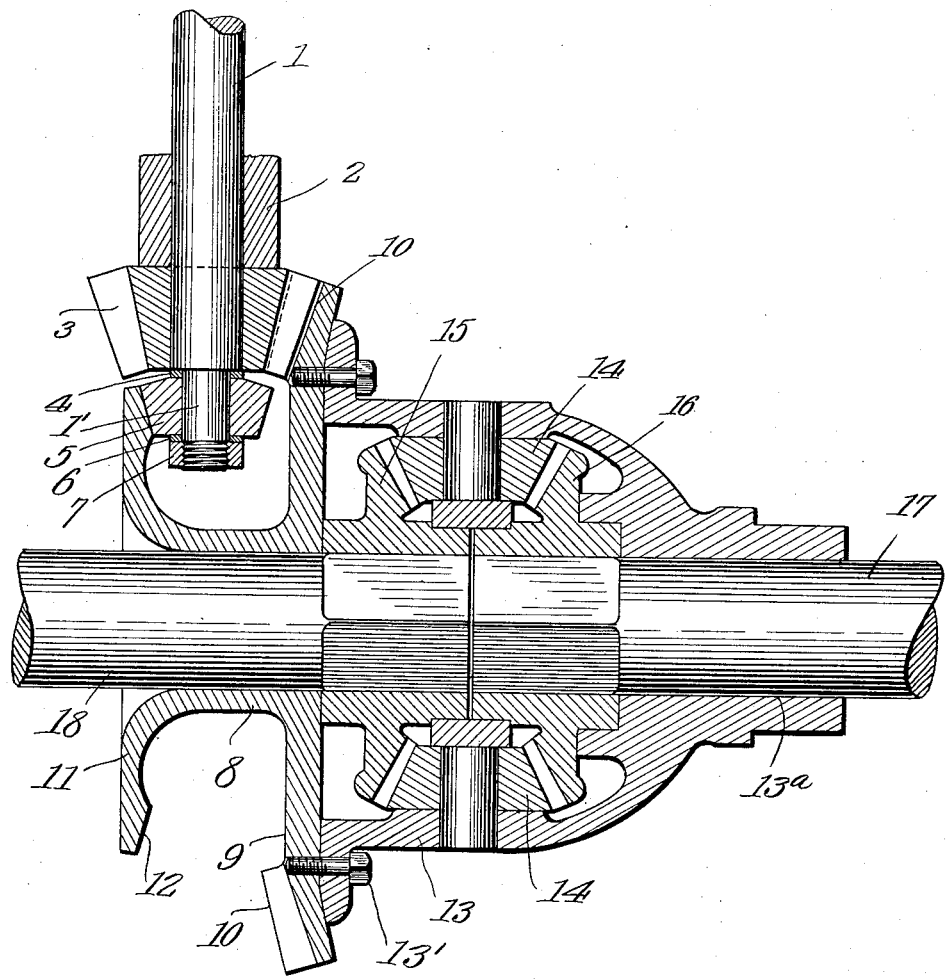
Frank Brown
Inventor,
by C. A. Snow & Co.
Attorneys.
Witnesses

UNITED STATES PATENT OFFICE.

FRANK BROWN, OF LEXINGTON, VIRGINIA.

DIFFERENTIAL TRANSMISSION MECHANISM.

1,097,843. Specification of Letters Patent. Patented May 26, 1914.

Application filed July 12, 1912. Serial No. 709,096.

*To all whom it may concern:*

Be it known that I, FRANK BROWN, a citizen of the United States, residing at Lexington, in the county of Rockbridge and State of Virginia, have invented a new and useful Differential Transmission Mechanism, of which the following is a specification.

The present invention relates to improvements in differential transmission mechanism, the primary object of the invention being the provision of a means whereby the driving shaft at its connection with the main gear of the differential is properly supported so as to relieve the same of the torsion or tendency to move transversely away from and into crowding relation to the main gear during the load strain thereon, the main gear being provided with an annular portion disposed to engage an anti-frictional roller disposed upon the extreme inner end of the driving shaft to oppose the strain of the main driving gear due to the point of its engagement with the main driven gear of a differential gearing.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings is illustrated an enlarged sectional view of a conventional differential gearing transmission mechanism with the present invention disposed in operable relation thereto.

Referring to the drawings, the numeral 1 designates the driving shaft which as usual is mounted in a bearing sleeve 2 and has keyed thereupon the driving pinion 3, said driving shaft in this instance being provided with the reduced end 1' and having a bushing or washer 4 mounted thereon adjacent to the junction of the enlarged and reduced portions of the shaft. Rotatably mounted upon the reduced end 1' of the driving shaft is the truncated conical bearing roller 5 which is held in place by means of the washer 6 and locking nut 7. The sleeve 8 is provided with the enlarged flange 9 carrying the bevel gear 10 upon its peripheral portion which is disposed to co-act and be in engagement at all times with the driving pinion 3, said bevel gearing 10 constituting the main driven element of the differential mechanism. The sleeve 8 at the opposite end to the bevel gearing 10 is provided with the disk 11 whose inner face near the periphery is beveled as at 12 to provide a bearing surface for the anti-frictional bearing roller 5, said bearing roller 5 thus opposing the strain thrown upon the gearing 10 by the driving pinion 3 and retaining the driving shaft 1 in proper relation to the gearing 10 and the differential mechanism.

The frame 13 of the differential mechanism is connected to the outer face of the disk 9 as at 13' and is of the usual construction, the present frame in this case carrying four transmission pinions 14 which mesh respectively at all times with the incased pinions 15 and 16 respectively. The pinion 15 is keyed upon the driven shaft 18 which is rotatably mounted within the sleeve 8 while the pinion 16 is keyed upon the oppositely disposed driven shaft 17 which is rotatably mounted within the sleeve portion 13$^a$ of the frame 13.

As the surface 12 is beveled and is engaged by the tapered roller 5, the longitudinal movement of the shaft toward the differential mechanism to a certain extent is prevented, these parts with the beveled gears 3 and 10 coöperating toward this end, and the too great crowding of the gear 3 with the gear 10 is thus relieved.

In a differential gearing transmission of this character, the anti-frictional roller 5 co-acting with the bevel surface 12 of the disk 11 provides a constant means which tends to retain the inner free end of the driving shaft 1 from any outward movement, thus providing at this point the only means of proper support for the extreme end of the driving shaft 1 and by reason of the mounting of the anti-frictional bearing roller 5, the friction consequent upon the same is reduced to a minimum.

What is claimed is:

In a differential transmission mechanism, a driving shaft, a beveled driving gear carried thereby, differential gearing having a bevel gear operably connected therewith, a tapered roller journaled upon the extreme end of the driving shaft and of smaller diameter than the driving gear, and a beveled rim carried by and engaging the tapered roller to prevent movement of the driving gear away from the beveled gear of the differential gearing and also to prevent longitudinal crowding movement of the driving gear toward the differential gearing.

In testimony that I claim the foregoing as my own, I have hereto affixed my signature in the presence of two witnesses.

FRANK BROWN.

Witnesses:
O. C. JACKSON,
NORMAN W. BURGESS.

Copies of this patent may be obtained for five cents each, by addressing the "Commissioner of Patents, Washington, D. C."